E. LINDENBERG.
TOOL.
APPLICATION FILED DEC. 4, 1916.
1,230,494.
Patented June 19, 1917.
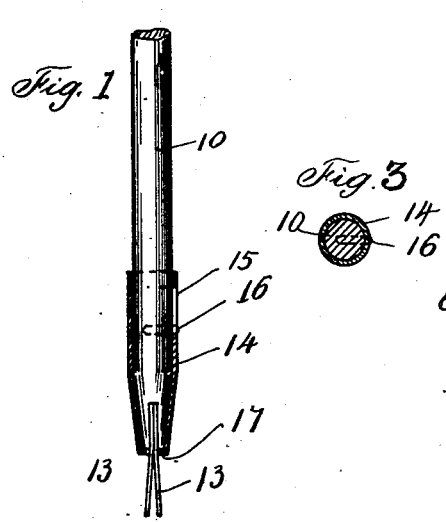
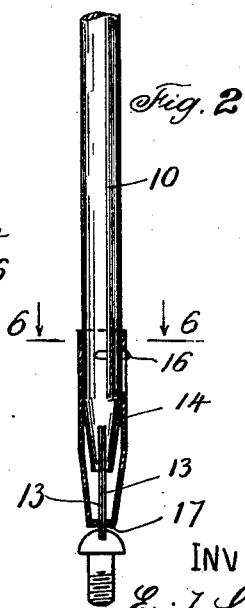
WITNESS
INVENTOR
Erich Lindenberg

UNITED STATES PATENT OFFICE.

ERICH LINDENBERG, OF CHICAGO, ILLINOIS.

TOOL.

1,230,494.  Specification of Letters Patent.  Patented June 19, 1917.

Application filed December 4, 1916. Serial No. 134,882.

*To all whom it may concern:*

Be it known that I, ERICH LINDENBERG, a citizen of the United States, residing at Chicago, in the county of Cook and State of Illinois, have invented certain new and useful Improvements in Tools, of which the following is a specification.

My invention relates to tools and has for its primary object the provision of an improved tool which shall have means for holding a screw by engagement with the slot thereof only.

A further object of my invention is the provision of a tool which shall have means for supporting a screw and driving the same by engagement only with the slot of the screw head.

With the above and other objects in view, this invention consists substantially in the combination, arrangement and construction of parts, all as hereinafter more fully described, shown in the accompanying drawings, which form a part of this specification and illustrate the preferred embodiment of my invention, and more particularly set forth in the subjoined claims.

Figure 1 is a fragmentary view of my invention showing in retracted position a finger piece forming a part thereof;

Fig. 2 is a view similar to Fig. 1 illustrating the finger piece in an adjusted position and a screw engaged by the tool; and Fig. 3 is a section taken on line 6—6 of Fig. 2.

My tool comprises a shank 10, preferably provided at its upper end with a knurled handle not shown. The lower end of shank 10 is preferably tapered, and carries a pair of spring steel finger pieces 13 which are fixed in the tapered end, protrude therefrom, and occupy normally a separated relation whereby their outer ends stand considerably apart, as illustrated in Fig. 1. The fingers 13 are of considerable breadth, whereby, when inserted in the slot in the head of a screw, they have sufficient rigidity to drive the screw to fully set position. By reason of their spring construction and normal tendency to stand apart at their outer ends I am enabled to support a screw A upon the outer ends of the fingers 13 by inserting them in the slot of the screw. In the assembling and repairing of watches, clocks and other delicate and intricate machinery a device of this character is of great utility, particularly inasmuch as I form the fingers 13 of a breadth less than the outer diameter of the head of the screw. By so limiting their breadth I am enabled to pass the shank 10 between the spokes of clock gears and other assembled parts and to set a screw in the rear of a watch or clock, for instance, in a location where nothing wider than the head of the screw will enter, that is, where assembled parts normally interfere with the setting or withdrawal of a screw because of the impossibility of inserting through the assembled parts any holding device larger than the head of the screw for retaining the screw and screw driver in operative association.

Inasmuch as the fingers 13 have a strong spring action, forcing their outer ends apart, it becomes advantageous, in delicate work particularly, to provide some means for forcing and holding their outer ends together for engagement with the screw slot and for carrying the torque applied to the shank outwardly to a point near the free ends of the fingers. A finger piece 14 slidably fits the end of the shank 10, and is provided with a longitudinal slot 15 which is engaged by a stud 16 fixed transversely in the shank. The lower end of the piece 14 is inclosed as at 17, and provided with an aperture just the width of the combined fingers 13 at the point where they enter the tapered end 12 of the shank. Obviously by moving the finger piece 14 from the position of Fig. 1, where it is retracted to the position of Fig. 2, the end 17 will force the separated fingers 13 together at their outer ends and permit their insertion in the slot of the screw. This will also relieve the fingers of the twisting incident to setting the screw by carrying the power applied to the shank 10 through stud 16 and piece 14 to the free ends of the fingers adjacent to the screw. Subsequent retraction of the finger piece 14 will leave the fingers 13 pressing outwardly against the sides of the screw slot with sufficient force to hold the screw in any desired position upon the end of the tool.

While I have illustrated and described the preferred embodiment of my invention, it will be obvious that one skilled in the art may make modifications thereof without departing from the spirit of the invention, such modifications, for instance, as forming one of the fingers 13 of rigid material while the other remains an out-bent spring. I wish, therefore, not to be restricted to the precise embodiment shown, except in so far as the same is limited in the appended claims.

I claim:

1. In a tool the combination with a shank of a pair of out-bent springs secured in an end of said shank in substantial alinement with the axis thereof, and a finger piece slidably embracing said end of the shank and the prongs and being provided with an aperture of substantially the same width as the combined thickness of said springs, and a pin protruding laterally from said shank and engaging a longitudinal slot provided in the finger piece.

2. In a tool the combination with a shank of a pair of flat springs protruding from an end of said shank in substantial alinement with the axis thereof and having their free ends standing normally apart, and a finger piece slidably embracing said end of the shank and provided at its outer end with an aperture of substantially the same width as the combined thickness of said springs, said piece being fixed against rotation upon the shank.

In testimony whereof I have affixed my signature.

ERICH LINDENBERG.